United States Patent
Fujimoto et al.

(10) Patent No.: US 11,603,501 B2
(45) Date of Patent: Mar. 14, 2023

(54) METHOD FOR PRODUCING BIO-JET FUEL

(71) Applicants: HiBD Laboratory Association, Fukuoka (JP); ENVIRONMENT ENERGY CO., LTD., Hiroshima (JP)

(72) Inventors: Kaoru Fujimoto, Fukuoka (JP); Yayoi Murakami, Fukuoka (JP); Shuji Noda, Hiroshima (JP)

(73) Assignees: HIBD LABORATORY ASSOCIATION, Fukuoka (JP); ENVIRONMENT ENERGY CO., LTD., Hiroshima (JP)

( * ) Notice: Subject to any disclaimer, the term of this patent is extended or adjusted under 35 U.S.C. 154(b) by 0 days.

(21) Appl. No.: 17/055,062

(22) PCT Filed: May 17, 2019

(86) PCT No.: PCT/JP2019/019756
§ 371 (c)(1),
(2) Date: Nov. 12, 2020

(87) PCT Pub. No.: WO2019/221287
PCT Pub. Date: Nov. 21, 2019

(65) Prior Publication Data
US 2021/0171844 A1    Jun. 10, 2021

(30) Foreign Application Priority Data
May 18, 2018    (JP) .............................. JP2018-096478

(51) Int. Cl.
*C10G 3/00* (2006.01)
*C10G 49/02* (2006.01)
(Continued)

(52) U.S. Cl.
CPC .............. *C10G 69/02* (2013.01); *B01J 21/04* (2013.01); *B01J 23/892* (2013.01); *B01J 29/146* (2013.01);
(Continued)

(58) Field of Classification Search
None
See application file for complete search history.

(56) References Cited

U.S. PATENT DOCUMENTS

2008/0163543 A1* 7/2008 Abhari ................... C10G 45/60
44/308
2008/0244962 A1 10/2008 Abhari et al.
(Continued)

FOREIGN PATENT DOCUMENTS

CN    101230291 A    7/2008
CN    103459031 A    12/2013
(Continued)

OTHER PUBLICATIONS

JP-5353893-B2 English Translation obtained from Espacenet, 2022, p. 1-26 (Year: 2022).*
(Continued)

*Primary Examiner* — Philip Y Louie
(74) *Attorney, Agent, or Firm* — Rothwell, Figg, Ernst & Manbeck, P.C.

(57) ABSTRACT

A method for producing a bio-jet fuel includes a reaction step of hydrogenating, isomerizing, and decomposing a crude oil obtained by a deoxygenation treatment of a raw oil containing a triglyceride and/or a free fatty acid, by using a hydrogenation catalyst and an isomerization catalyst in a hydrogen atmosphere under conditions of a reaction temperature of 180° C. to 350° C. and a pressure of 0.1 MPa to 30 MPa.

12 Claims, 6 Drawing Sheets

(51) Int. Cl.

| | | |
|---|---|---|
| *C10G 69/02* | (2006.01) | |
| *B01J 21/04* | (2006.01) | |
| *B01J 23/89* | (2006.01) | |
| *B01J 29/14* | (2006.01) | |
| *B01J 29/76* | (2006.01) | |
| *C10L 1/08* | (2006.01) | |

(52) U.S. Cl.
CPC ............ *B01J 29/7615* (2013.01); *C10L 1/08* (2013.01); *C10G 2300/1011* (2013.01); *C10G 2300/202* (2013.01); *C10G 2300/304* (2013.01); *C10G 2300/307* (2013.01); *C10G 2300/308* (2013.01); *C10G 2300/4006* (2013.01); *C10G 2300/4012* (2013.01); *C10G 2300/4018* (2013.01); *C10G 2400/08* (2013.01); *C10L 2200/043* (2013.01); *C10L 2200/0469* (2013.01); *C10L 2270/026* (2013.01)

(56) References Cited

U.S. PATENT DOCUMENTS

| | | | |
|---|---|---|---|
| 2009/0069610 A1* | 3/2009 | Roberts, IV | ........... C10G 47/00 585/24 |
| 2009/0229172 A1 | 9/2009 | Brady et al. | |
| 2009/0287029 A1 | 11/2009 | Anumakonda et al. | |
| 2012/0156109 A1 | 6/2012 | Parimi et al. | |
| 2012/0203040 A1 | 8/2012 | Ratnasamy | |
| 2012/0216449 A1* | 8/2012 | Hayasaka | ................ C10G 3/46 44/307 |
| 2014/0163272 A1 | 6/2014 | Mukherjee et al. | |
| 2014/0275670 A1 | 9/2014 | Aulich et al. | |
| 2014/0275689 A1 | 9/2014 | Petrovic et al. | |
| 2017/0158966 A1 | 6/2017 | Fichtl et al. | |

FOREIGN PATENT DOCUMENTS

| | | | |
|---|---|---|---|
| JP | 2011-052077 A | 3/2011 | |
| JP | 2011-515539 A | 5/2011 | |
| JP | 2011-526640 A | 10/2011 | |
| JP | 5353893 B2 * | 11/2013 | ............. B01J 21/08 |
| JP | 2015-531430 A | 11/2015 | |
| JP | 2016-519692 A | 7/2016 | |
| WO | WO 2009/151692 A2 | 12/2009 | |
| WO | WO 2010/000934 A1 | 1/2010 | |
| WO | WO 2010/050186 A1 | 5/2010 | |
| WO | 2012083236 A2 | 6/2012 | |
| WO | 2015107487 A1 | 7/2015 | |
| WO | WO 2016/060450 A1 | 4/2016 | |

OTHER PUBLICATIONS

Written Opinion for Singapore patent application No. 11202011450R dated Jun. 18, 2021; 7 pages.
Supplementary European Search Report for European patent application No. 19804579.1 dated Jun. 25, 2021, 8 pages.
ISR for PCT/JP2019/019756, dated Aug. 6, 2019.
Translation of IPRP for PCT/JP2019/019756, 2020.
Office Action dated Feb. 8, 2022, issued for the corresponding Chinese Patent Application No. 201980032001.5, 15 pages.
Hearing Notice for Indian patent application No. 202017047352, dated Oct. 28, 2021, 3 pages.

* cited by examiner

METHOD FOR PRODUCING BIO-JET FUEL

TECHNICAL FIELD

The present invention relates to a method for producing a bio-jet fuel, in which a crude oil obtained by a deoxygenation treatment of a raw oil containing a triglyceride and/or a free fatty acid is used as a raw material.

BACKGROUND ART

In recent years, measures against global warming have been urgent issues. A development of a bio-jet fuel as a carbon-free fuel, as one measure for solving such issues, has been an extremely important development theme for reducing the emissions of global greenhouse gases and for building an energy recycling society.

Not only various studies are currently made, but also various documents are reported in accordance therewith, in order to achieve such a theme. For example, Patent Literature 1 discloses "a method for producing a diesel fuel fraction and a bio-jet fuel fraction, comprising treating a renewable feedstock with a catalyst in a hydrogen atmosphere by hydrogenating and deoxygenating to provide a hydrocarbon fraction, which is then isomerized and selectively cracked, and then separating the resulting diesel fuel fraction/bio-jet fuel fraction/naphtha product/LPG in a selective hot high pressure hydrogen stripper".

Patent Literature 2 discloses "a method for producing a bio-jet fuel or a blended oil of a jet fuel and a bio-jet fuel, comprising performing a hydrodeoxygenation reaction of a biological oil by using a hydrodeoxygenation catalyst in a hydrogen gas atmosphere to thereby produce n-paraffin, in the first stage, performing an isomerization reaction of n-paraffin and a hydrogen gas in the presence of an isomerization catalyst to thereby produce isoparaffin and a separation fraction, in the second stage, and performing isomerization of the fraction which is obtained at the second stage and which has a boiling point of 200° C. or more, in the presence of an isomerization catalyst".

Patent Literature 3 discloses "a method for converting triacylglycerols-containing oils into hydrocarbon fuels, including reacting a triacylglycerols-containing oil-water-hydrogen mixture at a temperature in the range from about 250° C. to about 560° C. and a pressure of about 75 bar to convert at least a portion of the triacylglycerols and recovering a reaction effluent comprising water and one or more of isoolefins, isoparaffins, cycloolefins, cycloparaffins, and aromatics; and hydrotreating the reaction effluent to form a jet fuel.".

Patent Literature 4 discloses "a method for hydro-isomerization of a paraffinic hydrocarbon feedstream, comprising contacting the hydrocarbon feedstream with hydrogen, and a catalyst comprising a crystalline silicate molecular sieve containing iron in the crystal framework, to thereby obtain a biodiesel fuel and a bio-jet fuel".

Patent Literature 5 discloses "a method for producing a bio-jet fuel with non-cooking fat and oil as a raw material, comprising forming a reaction product containing a paraffin-based hydrocarbon and an aromatic compound through a deoxygenation reaction, an isomerization reaction and an aromatization reaction from a liquid non-cooking fat and oil in the presence of a catalyst without adding hydrogen".

CITATION LIST

Patent Literatures

Patent Literature 1: Japanese Unexamined Patent Application Publication (Translation of PCT Application) No. 2011-515539
Patent Literature 2: Japanese Patent No. 5506791
Patent Literature 3: Japanese Unexamined Patent Application Publication (Translation of PCT Application) No. 2015-531430
Patent Literature 4: Japanese Unexamined Patent Application Publication (Translation of PCT Application) No. 2016-519692
Patent Literature 5: International Publication No. WO 2016/060450

SUMMARY OF INVENTION

Technical Problem

However, the above conventional arts have the following problems.

(1) Patent Literature 1 discloses a two-step reaction process including subjecting raw material fat and oil to a hydrogenation deoxygenation reaction and then to an isomerization decomposition reaction, and thus a problem is that not only a large amount of hydrogen is consumed in the hydrogenation deoxygenation reaction, but also normal paraffin having a backbone structure of a free fatty acid is produced, thereby consequently causing the isomerization decomposition reaction to be made in stringent reaction conditions and causing such a reaction to be complicated and deficient in energy saving properties.

(2) Patent Literature 2 discloses a method involving a hydrogenation deoxygenation reaction step of raw material fat and oil, and thus a problem is that not only a large amount of hydrogen is consumed, but also both products obtained through first isomerization to second isomerization (recirculation flow of heavy oil) indicated in Example 1 of paragraph [0086] in the specification do not reach a solidifying point of −40° C. and have a high pour point, and have a difficulty in satisfying the pour point of a jet fuel that is −40° C.

(3) Patent Literature 3 discloses a method for obtaining a jet fuel by subjecting fat and oil to a hydrothermal reaction at a high temperature and a high pressure in the presence of water and hydrogen and thereafter to a hydrogenation reaction, and not only a problem is that energy saving properties are deficient and the amount of hydrogen consumed is large, but also a problem is that the yield of aromatics is as large as 32.6 wt % as shown in paragraphs [0052] and [0053] in the specification and does not satisfy 0.5 mass % or lower according to ASTM. There is neither any description about the pour point, nor any description about a product compound, and it is unclear whether not only the content rate of aromatics, but also other standard such as pour point is satisfied or not.

(4) Patent Literature 4 describes "under hydro-isomerization conditions that include pressures from about 400 to about 2000 psig (2.86 to 13.89 MPa)" in paragraph [0014] in the specification and also describes that the reaction pressure in Example 3 of paragraphs [0047] and [0048] in the specification is 580 psig (3.55 MPa) which is a high pressure, and thus has the problem of a need for any measure against high-pressure gas.

(5) Patent Literature 5 has the problems of many aromatic fractions causing soot, including 60.7% of an aromatic compound in Example 2, and 69% of such an aromatic compound using a β zeolite catalyst and 36.2% of such an aromatic compound using a Y zeolite catalyst in Example 3, and thus combustion properties are deficient for a jet fuel.

In order to solve the above conventional problems, the present inventor has made intensive studies about a method for producing a bio-jet fuel, in which a crude oil obtained by a deoxygenation treatment of a raw oil containing a triglyceride and/or a free fatty acid, such as biological fat and oil, and a waste food oil, is used as a raw material.

A crude oil obtained by a deoxygenation treatment, particularly by a decarboxylation treatment using a fat and oil decarboxylation decomposition catalyst has been variously analyzed, and as a result, has been found to have the following physical properties.

(1) A crude oil obtained in a decarboxylation step is an oil consisted of a hydrocarbon compound having 6 to 25 carbon atoms, having a distribution of the number of carbon atoms which peak is at a number of carbon atoms of 15 to 17, and has the problems of having larger number of carbon atoms and lower in yield of a jet fuel fraction than a jet fuel mainly including a hydrocarbon compound having 9 to 15 carbon atoms.

(2) The hydrocarbon compound mainly included is a linear saturated hydrocarbon and has a freezing point and a pour point which are each −15° C. or more, and a problem is that such points are too high for a jet fuel.

(3) Since an aromatic hydrocarbon is partially produced in the decarboxylation step and the content rate thereof is about 1 to 20%, a problem is that the condition where the content rate of an aromatic hydrocarbon in a bio-jet fuel is a maximum of 0.5% is not satisfied.

(4) A product oil having an acid value, which indicates content of a fatty acid, of 0 to 20 mg-KOH/g-oil is obtained in the decarboxylation step, and a problem is that such an acid value is required to be about 0 mg-KOH/g-oil because the fatty acid remarkably affects the oxidation stability of a fuel.

An object of the present invention is to provide a method for producing a bio-jet fuel, which can mass-produce a bio-jet fuel capable of achieving the following standards (ASTM D7566-Annex 2), from a crude oil having the above physical properties, at a low cost:
a) being a refined oil mainly including a hydrocarbon compound having 9 to 15 carbon atoms;
b) having a pour point of −40° C. or lower;
c) having an aromatic hydrocarbon content rate of 0.5 mass % or lower;
d) having an acid value of almost 0 mg-KOH/g-oil (0.015 mg-KOH/g-oil or lower);
e) having a cycloparaffin content rate of 15 mass % or lower.

Solution to Problems

In order to solve the above problems, the method for producing a bio-jet fuel of the present invention has the following configuration.

A method for producing a bio-jet fuel of the present invention <1> has the configuration in which comprises a reaction step of hydrogenating, isomerizing, and decomposing a crude oil obtained by a deoxygenation treatment of a raw oil containing a triglyceride and/or a free fatty acid, by using a hydrogenation catalyst and an isomerization catalyst in a hydrogen atmosphere under conditions of a reaction temperature of 180° C. to 350° C. and a pressure of 0.1 MPa to 30 MPa.

The above configuration provides the following effects.

(1) Hydrogenation can allow for saturation of a double bond of an aromatic component and conversion of the aromatic component into cycloalkane or the like, resulting in a decrease in content of the aromatic component.

(2) Hydrogenation can allow for deoxygenation of free fatty acid derived from the raw oil (crude oil), resulting in a decrease in acid value.

(3) Isomerization and/or hydrogenation decomposition can allow for conversion of components in the crude oil into cycloparaffin, isoparaffin, or normal paraffin, thereby resulting in decreases in freezing point and pour point.

(4) An apparatus can be operated under low reaction temperature and reaction pressure conditions, and thus not only energy saving properties are excellent, but also the production cost of the apparatus can be significantly reduced.

(5) Hydrogenation can allow for saturation of a double bond of an olefin compound (olefins), resulting in conversion of the olefin compound into a paraffin compound (paraffins).

The foregoing actions can be obtained, and thus a bio-jet fuel composition (or a composition approximate thereto) can be efficiently obtained in a reaction step.

Examples of the raw oil containing a triglyceride and/or a free fatty acid include plant oil, plant fat, plant oil and plant fat obtained by genetic engineering, animal fat, fish oil, or a mixture thereof.

Specific examples of such waste food oil, plant oil and plant fat include sunflower oil, rapeseed oil, canola oil, palm oil, palm kernel oil, soybean oil, hemp oil, olive oil, perilla oil, linseed oil, mustard oil, peanut oil, castor oil, coconut oil, peregrina oil, tall oil contained in pulp of a pine tree, and waste material such as oil and fat discharged from the food industry, or a mixture thereof.

Examples of such animal oil and animal fat include bacon fat, lard, tallow, cream, and waste material such as oil and fat discharged from the food industry, or a mixture thereof.

Other examples also include terpene oil, fish oil, fat and oil collected from certain algae, dark oil, sludge, and oil raw material wasted and pressed from fruits or seeds before oil-pressing, for example, flesh and seed of oil palm, albumen of coconut palm, fruits of rapeseed and olive, seeds of perilla, castor-oil plant and the like, and seeds of peregrine and *Cornus* wisoniana.

The crude oil to be subjected to reactions in the reaction step in the present invention is obtained by a deoxygenation treatment of the above-mentioned raw oil containing a triglyceride and/or a free fatty acid. Examples of the deoxygenation treatment include a decarboxylation treatment of a raw oil by using a fat and oil decarboxylation decomposition catalyst (for example, method described in Japanese Patent No. 5353893), a methylesterification treatment by adding methanol to a raw oil, and a hydrogenation and deoxygenation treatment of a raw oil under a high pressure. The decarboxylation treatment with a fat and oil decarboxylation decomposition catalyst is preferable because a desired bio-jet fuel composition (or a composition approximate thereto) can be easily obtained in the reaction step. Such a decarboxylation treatment will be described below.

The reaction temperature here used is 180° C. to 350° C., preferably 200° C. to 320° C. A tendency is seen where, as the temperature is lower than 200° C., a higher saturated hydrocarbon is not degraded and remains. Further, a tendency is seen where, as the temperature is more than 320° C., the yield of a bio-jet fuel fraction by excess decomposition is decreased. Such tendencies are remarkably seen as the temperature is lower than 180° C. or more than 350° C. and thus these temperatures are not preferable.

The pressure here used is 0.1 MPa to 30 MPa, preferably 0.5 MPa to 3 MPa, more preferably 0.5 MPa to 2.5 MPa, further preferably 1 MPa to 2.5 MPa. A tendency is seen where, as the pressure is lower than 1 MPa, hydrogenation is made insufficient to result in an increase in content rate of an aromatic hydrocarbon, and such a tendency is more remarkably seen particularly as the pressure is lower than 0.1 MPa. A tendency is also observed where, as the pressure is more than 2.5 MPa, an improvement in composition is lower to result in deterioration in energy saving properties. The method of the present invention provides a bio-jet fuel composition (or a composition approximate thereto) even at a pressure of 2.5 MPa or lower.

The catalysts used may be a hydrogenation catalyst and an isomerization catalyst, and such catalysts may be used separately or in combination. The detail will be described below.

A fixed bed system is preferably used in a reaction vessel. Each reaction is preferably performed as a continuous reaction. The hydrogenation reaction and the isomerization reaction may be performed in respective separate reaction vessels, while it is preferably performed in the same reaction vessel.

Hydrogen gas and the crude oil are fed to a reactor at $H_2$/raw oil=500 to 5000 vol/vol, preferably 1000 to 2000 vol/vol. A tendency is seen where, as the ratio is lower than 1000 vol/vol, hydrogenation is made insufficient to result in an increase in content rate of an aromatic hydrocarbon as a reaction product, and a tendency is seen where, as the ratio is more than 2000 vol/vol, the retention time of a reaction product is shorter, an unreacted product is increased, and hydrogen is wasted highly and required to be recycled, thereby causing an apparatus to be complicated. These tendencies are more remarkably seen particularly as the ratio is lower than 500 vol/vol or more than 5000 vol/vol.

In the present invention, "in a hydrogen atmosphere" is preferably in an atmosphere consisting of only hydrogen gas, and such an atmosphere may include any inert gas such as nitrogen, argon, and the like as long as the reaction is not affected.

The method for producing a bio-jet fuel of the present invention <2> has the configuration in which, according to the above-described method for producing a bio-jet fuel <1>, the hydrogenation, isomerization and decomposition are performed by use of a hydro-isomerization catalyst comprising a hydrogenation catalyst and an isomerization catalyst in the reaction step.

The above configuration can allow a bio-jet fuel to be more efficiently produced than a case where the hydrogenation catalyst and the isomerization catalyst are separately used. While these reactions may be performed in one reaction vessel as in the method <3> for producing a bio-jet fuel of the present invention, described below, a reaction mainly of hydrogenation and a reaction mainly of isomerization/decomposition may be separately performed by using two or more reaction vessels different in reaction conditions (temperature, pressure, and the like).

The method for producing a bio-jet fuel of the present invention <3> has the configuration in which, according to the above-described method for producing a bio-jet fuel <2>, the hydrogenation, isomerization and decomposition are simultaneously performed by using a hydro-isomerization catalyst comprising a hydrogenation catalyst and an isomerization catalyst in the reaction step.

The above configuration can allow a bio-jet fuel to be more efficiently produced by one-stage reaction. Performing the hydrogenation, isomerization and decomposition simultaneously does not mean that these reactions are performed exactly at the same time, but mean that the hydrogenation, isomerization and decomposition occur together along with passing through the hydro-isomerization catalyst bed.

The method for producing a bio-jet fuel of the present invention <4> has the configuration in which the deoxygenation treatment is a decarboxylation treatment using a fat and oil decarboxylation decomposition catalyst in any one of the above-described method for producing a bio-jet fuel <1> to <3>.

The decarboxylation treatment with a fat and oil decarboxylation decomposition catalyst is specifically described in, for example, Japanese Patent No. 5353893. Specifically, such a method involves contacting a fat and oil decarboxylation decomposition catalyst with fat and oil (raw oil containing a triglyceride and/or a free fatty acid) at 350° C. to 475° C. in a reaction container. The method mainly produces an aliphatic hydrocarbon having 8 to 24 carbon atoms according to the following reaction scheme.

wherein
$R_1$, $R_2$, and $R_3$ each is an alkyl group forming fat and oil, and each is a chain paraffin or olefin.
$C_XH_Y$ mainly is propane, which has 3 carbon atoms, and small amounts of methane, ethane, and butane are else produced.

The method for producing a bio-jet fuel of the present invention <5> has the configuration in which the fat and oil decarboxylation decomposition catalyst comprises any of magnesium hydroxide, oxide, and carbonate in the above-described method for producing a bio-jet fuel <4>.

Specific examples include one obtained by coating any of activated carbon, active coke, and a mixture thereof with any of magnesium hydroxide, oxide, and carbonate.

Such a catalyst can be used to thereby efficiently decarboxylate the raw oil.

The method for producing a bio-jet fuel of the present invention <6> has the configuration in which, in the above-described method for producing a bio-jet fuel <4> or <5>, the crude oil obtained by a decarboxylation treatment of a raw oil containing a triglyceride and/or a free fatty acid satisfies the following requirements a) to e):
a) comprising a hydrocarbon compound having 16 or more carbon atoms;
b) having a pour point of −15° C. or more;
c) having an aromatic hydrocarbon content rate of 1 to 15 mass %;

d) having an acid value of 0 to 20 mg-KOH/g-oil; and
e) having a cyclic compound content rate of 15 mass % or lower.

The above configuration can allow a crude oil more suitable for the production of a bio-jet fuel to be obtained.

In condition a), for example, 5% or more of a hydrocarbon compound having 16 or more carbon atoms is comprised, and 10% or more of the compound can be comprised.

In condition b), the upper limit of the pour point is about 10° C.

In condition c), the content rate of an aromatic hydrocarbon is 1 to 10 mass %.

In condition d), the acid value can be 0 to 10 mg-KOH/g-oil.

In condition e), the content rate of a cyclic compound can be 10 mass % or lower.

The method for producing a bio-jet fuel of the present invention <7> has the configuration in which the reaction in the reaction step is performed at 0.5 MPa to 3 MPa in any one of the above-described method for producing a bio-jet fuel <1> to <6>.

The method of the present invention can efficiently provide a bio-jet fuel composition (or a composition approximate thereto) even by such a low-pressure reaction.

The method for producing a bio-jet fuel of the present invention <8> has the configuration in which the hydrogenation catalyst comprises a Group 9 metal and/or a Group 10 metal in any one of the above-described method for producing a bio-jet fuel <1> to <7>.

Examples of the Group 9 metal include Co. Examples of the Group 10 metal include Ni, Pd and Pt, and two or more thereof are preferably used. For example, Ni and Pd are preferably used. A porous material large in surface area, such as alumina, silica, or active carbon, is preferably used as a carrier of such a catalyst. Herein, any Group 6 metals such as Mo or W, any Group 8 metals such as Ru, and any Group 11 metals such as Cu may be further included.

The method for producing a bio-jet fuel of the present invention <9> has the configuration in which the isomerization catalyst comprises a solid acid catalyst in any one of the above-described method for producing a bio-jet fuel <1> to <8>.

The isomerization catalyst here used is, for example, a catalyst including a metal halide such as aluminum halide, or a solid acid catalyst including silica alumina, activated alumina, activated white earth, or zeolite, and is preferably a solid acid catalyst including zeolite. This can allow for efficient isomerization and/or decomposition of higher olefin and higher paraffin to lower paraffin by an inexpensive catalyst.

Examples of the zeolite include β-type zeolite, Y-type zeolite, MFI zeolite, mordenite, and L-type zeolite. β-Type zeolite, Y-type zeolite, and MFI zeolite are preferable, and β-type zeolite is more preferable because not only heat resistance and water resistance to water or the like generated by hydrogenation of a free fatty acid are excellent, but also the effect of suppressing caulking can be expected.

The method for producing a bio-jet fuel of the present invention <10> has the configuration in which the hydro-isomerization catalyst is a mixed catalyst having a mixing ratio of hydrogenation catalyst:isomerization catalyst of 5:95 to 95:5 in any one of the above-described method for producing a bio-jet fuel <2> to <9>.

The hydro-isomerization catalyst here used is a mixed catalyst having a mixing ratio of hydrogenation catalyst: isomerization catalyst of 5:95 to 95:5, preferably 10:90 to 90:10. A tendency is seen where, as the mixing ratio of the hydrogenation catalyst is lower, hydrogenation is made insufficient to result in an increase in content rate of an aromatic hydrocarbon as a reaction product and a reduction in yield of a bio-jet fuel fraction due to excess decomposition. Further, a tendency is seen where, as the mixing ratio of the hydrogenation catalyst is higher, the isomerization reaction is suppressed and a higher saturated hydrocarbon remains being not reacted, resulting in no drops in freezing point or pour point.

An inert substance may be mixed at a mixing ratio of hydro-isomerization catalyst:inert substance of 10 to 90:90 to 10. Such an inert substance is mixed so that the inert substance is interposed to thereby disperse a crystalline hydro-isomerization catalyst and enhance catalytic activity of the hydro-isomerization catalyst, because the hydro-isomerization catalyst is a crystalline substance. Examples of the inert substance include glass beads, silica beads, and alumina beads.

The method for producing a bio-jet fuel of the present invention <11> has the configuration in which the hydro-isomerization catalyst is a composite of a hydrogenation catalyst and an isomerization catalyst in any one of the above-described method for producing a bio-jet fuel <2> to <10>.

The hydro-isomerization catalyst in the present invention may be in the state of being merely mixed, while it is preferably an integrated composite. The composite may be, for example, one where an isomerization catalyst particle is attached to or supported on the surface of a hydrogenation catalyst particle, one where a hydrogenation catalyst particle is attached to or supported on the surface of an isomerization catalyst particle, or one where a hydrogenation catalyst particle and an isomerization catalyst particle are mixed and integrated by using a binder.

The method for producing a bio-jet fuel of the present invention <12> has the configuration in which the hydrogenation catalyst is powderized so as to have a particle size smaller than a particle size of the isomerization catalyst, and is attached to or supported on a surface of the isomerization catalyst in any one of the above-described method for producing a bio-jet fuel <2> to <11>.

The above configuration provides the following effects.

(1) A fine particle of the hydrogenation catalyst is attached to or supported on the particle surface of the isomerization catalyst, and thus an active site of a higher paraffin near the particle surface of the isomerization catalyst is moved toward the hydrogenation catalyst, allowing such a higher paraffin to be efficiently hydrogenated and decomposed into a low-molecular paraffin and/or to be isomerized into an isoparaffin. This can allow for an effective increase in the content rate of a hydrocarbon compound having 9 to 15 carbon atoms.

(2) An aromatic hydrocarbon can be effectively hydrogenated, resulting in a reduction in the content rate of the aromatic hydrocarbon.

(3) Hydrogenation can allow a free fatty acid to be effectively decomposed, resulting in a reduction in acid value.

The method for producing a bio-jet fuel of the present invention <13> has the configuration in which 1 to 10 mass % of Cu is added to the hydrogenation catalyst in any one of the above-described method for producing a bio-jet fuel <1> to <12>.

The above configuration provides the following effects.

(1) Cu is added to the hydrogenation catalyst, thereby allowing methanation from a methyl group at the end of paraffin due to hydrogenation decomposition to be suppressed and allowing hydrogenation of olefin to be smoothly performed.

(2) Cu is added to the hydrogenation catalyst, thereby allowing a linear paraffin to be randomly decomposed and allowing a higher paraffin to be formed into a lower paraffin, resulting in a decrease in pour point.

(3) Toluene is hydrogenated and thus converted into cyclohexane and further converted into dimethylcyclopentane, and hexadecane ($C_{16}H_{34}$) is decomposed and isomerized into octane, dimethylcyclohexane, 2-methyloctane, or the like and thus decreased in molecular weight, also resulting in a decrease in pour point.

(4) It is possible to perform a deoxygenation reaction of a carboxyl group and a carbonyl group of a free fatty acid.

The amount of Cu added is here 1 to 10 mass %, preferably 2 to 5 mass %. A tendency is seen where, as the amount is lower than 2 mass %, the amount of methane produced due to dissociation of a methyl group at an end of paraffin is increased, a tendency is seen where, as the amount is more than 5 mass %, the ability of hydrogenation with Ni is deteriorated, and these tendencies are strongly seen in an amount of lower than 1 mass % or more than 10 mass % and are not preferable. Herein, Fe may be used instead of Cu.

The method for producing a bio-jet fuel of the present invention <14> has the configuration in which a liquid hourly space velocity on a catalyst bed is 0.1 to 10 h$^{-1}$ in the reaction step in any one of the above-described method for producing a bio-jet fuel <1> to <13>.

The liquid hourly space velocity (LHSV) on the catalyst bed can be set to 0.1 to 10.0 h$^-$, thereby allowing the crude oil to be subjected to sufficient hydrogenation, hydrogenation decomposition, deoxygenation decomposition, and a naphthenization reaction of aromatics in a hydrogen atmosphere.

The liquid hourly space velocity on the catalyst bed is here preferably 0.1 to 10.0 h$^-$, and more preferably 0.2 to 4.0 h$^-$, further preferably 0.2 to 2.0 h$^{-1}$ is applied. A tendency is seen where, as the liquid hourly space velocity is lower than 0.2 h$^-$, the yield of a bio-jet fuel fraction due to excess decomposition is decreased, and a tendency is seen where, as the liquid hourly space velocity is more than 2.0 h$^-$, a higher saturated hydrocarbon is not reacted and remains. These tendencies are strongly seen at lower than 0.1 h$^{-1}$ or more than 10.0 h$^{-1}$.

The method for producing a bio-jet fuel of the present invention <15> has the configuration in which, in any one of the above-described method for producing a bio-jet fuel <1> to <14>, a refined oil obtained in the reaction step satisfies the following requirements A) to E):

A) comprising 60 mass % or more of a hydrocarbon compound having 9 to 15 carbon atoms;
B) having a pour point of −40° C. or lower;
C) having an aromatic hydrocarbon content rate of 0.5 mass % or lower; and
D) having an acid value of 0.015 mg-KOH/g-oil or lower.
E) having a cycloparaffin content rate of 15 mass % or lower.

In condition A), preferably 70 mass % or more, more preferably 80 mass % or more of the hydrocarbon compound having 9 to 15 carbon atoms is comprised.

Advantageous Effects of Invention

As described above, the method for producing a bio-jet fuel of the present invention can satisfy the main standards according to ASTM D7566-Annex 2. The method has the following effects.

(1) Since a naturally occurring crude oil is used as a raw material, a carbon-free and high-quality bio-jet fuel can be produced at a high yield and at a low cost.

(2) Since production can be made in relatively low temperature and low operating pressure conditions, for example, a reaction at a pressure of lower than 1.0 MPa which is not included in the definition with respect to high pressure gas according to the High Pressure Gas Safety Act can be performed, and a high-quality bio-jet fuel containing mainly isoparaffin and containing a small amount of an aromatic compound can be safely and economically obtained at a high yield.

(3) The resulting bio-jet fuel is almost made of hydrocarbon, and can be optionally mixed with a jet fuel obtained from a petroleum-derived raw material.

(4) Not only hydrogenation can lead to decarboxylation of a free fatty acid derived from a crude oil for a bio-fuel to thereby allow the acid value to be remarkably reduced and approximated to 0 mg-KOH/g-oil, but also isomerization and hydrogenation decomposition can lead to conversion of an aromatic hydrocarbon, olefin, and n-paraffin into cycloparaffin, isoparaffin, and normal paraffin, thereby resulting in decreases in freezing point and pour point.

DESCRIPTION OF EMBODIMENTS

Hereinafter, an apparatus for producing a bio-jet fuel in the present invention will be described with reference to drawings and specifically described with reference to Examples, but the scope of the present invention is not limited thereto.

Figure 1:
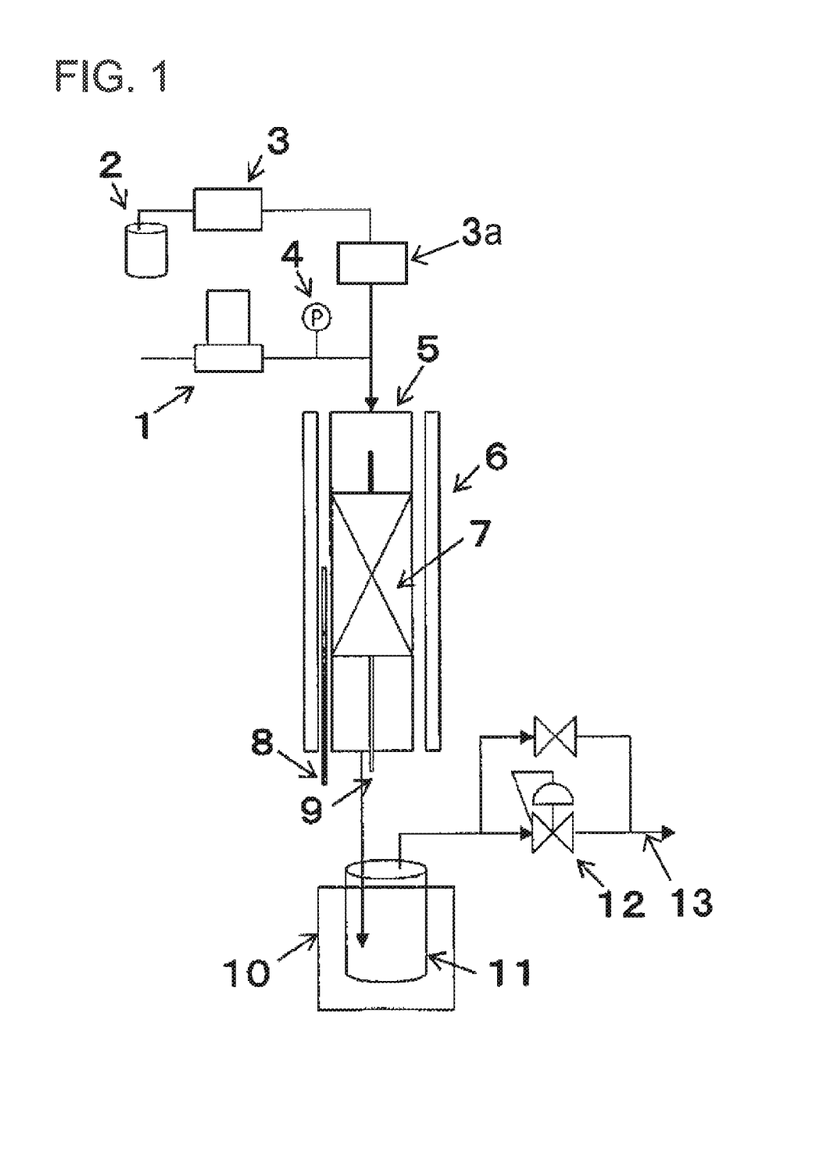
FIG. 1 A schematic view of a main section of an apparatus for producing a bio-jet fuel in the present invention is illustrated.

FIG. 1 is a schematic view of a main section of an apparatus for producing a bio-jet fuel in the present invention. Reference numeral 1 indicates a hydrogen mass flow controller for controlling the flow rate of hydrogen and maintaining the pressure of a reactor to 0.5 MPa to 3 MPa; reference numeral 2 indicates a raw oil tank for storing the crude oil obtained by decomposing a naturally occurring triglyceride-containing raw oil; reference numeral 3 indicates a transfer pump; reference numeral 3a indicates a preheater for pre-heating a raw oil to 150 to 320° C.; reference numeral 4 indicates a pressure gauge; reference numeral 5 indicates a fixed bed-type reaction vessel for performing hydro-isomerization, and decomposition reactions of a crude oil with a hydro-isomerization catalyst in a hydrogen atmosphere; reference numeral 6 indicates a heater for heating the reaction vessel 5 to 180° C. to 350° C.; reference numeral 7 indicates a hydro-isomerization decomposition catalyst; reference numeral 8 indicates an external temperature controller for measuring the external temperature of a reaction vessel; reference numeral 9 indicates an internal temperature controller for measuring the internal temperature of a reaction vessel; reference numeral 10 indicates a cooler of a reaction product; reference numeral 11 indicates a bio-jet fuel reservoir; reference numeral 12 indicates a pressure holding valve; and reference numeral 13 indicates an outflow portion of a gaseous phase fraction.

The method for producing a bio-jet fuel of the present invention is briefly described in the following by using the apparatus for producing a bio-jet fuel, configured as above.

First, a sealed fixed bed reaction vessel 5 is loaded with a hydro-isomerization decomposition catalyst 7 consisting of a mixture of a hydrogenation catalyst and an isomerization decomposition catalyst, thereby preparing a fixed bed of the hydro-isomerization decomposition catalyst 7. Next, the internal temperature of the fixed bed reaction vessel 5 is heated to around 180 to 350° C. by the heater 6. A hydrogen gas is allowed to flow from the hydrogen gas mass flow controller 1 until the pressure in the reaction vessel reaches 0.5 to 3 MPa. A crude oil for a bio-fuel, while being heated to 150 to 320° C. by the preheater 3a, is transferred by the transfer pump 3 from the raw oil tank 2 to the pre-heated fixed bed reaction vessel 5. A biodiesel fuel is subjected to hydro-isomerization, and decomposition reactions with the superficial velocity in the fixed bed reaction vessel 5 being kept at 0.1 to 10.0 h$^{-1}$ at one-stage and converted into a bio-jet fuel. The resulting reaction product is cooled in the cooler 10 and thus subjected to gas-liquid separation. A liquid fraction obtained by such gas-liquid separation is reserved as a crude oil for a bio-jet fuel in a reservoir tank, and a gaseous phase fraction is discharged through the outflow portion 13 toward the outside of the system. The crude oil for a bio-jet fuel is sent to a rectification apparatus not illustrated, and separately flows as a kerosine fraction and is converted into a bio-jet fuel.

EXAMPLES

1) Raw Material (Crude Oil for Bio-Fuel)

Each sample shown in (Table 2) was used as a raw material.

In (Table 2), "HiBD crude oil" is a crude oil for a bio-fuel, produced based on the description of Japanese Patent No. 5353893.

(1) Examination of Model Compound

A crude oil for a bio-fuel differs in physical properties depending on the raw material composition.

(Table 1) shows oil characteristics of a crude oil for a bio-fuel with respect to each bio raw material. In the Table, "HiBD" is a registered trademark of Kaoru, FUJIMOTO.

TABLE 1

| Test items | Unit | HiBD (raw material: palm oil) | HiBD (raw material: waste food oil) | Test method |
|---|---|---|---|---|
| Density at 15° C. | g/cm3 | 0.8172 | 0.8245 | JIS K 2249 |
| Kinetic viscosity at 30° C. | mm$^2$/s | 2.812 | 1.870 | JIS K 2283 |
| Flash point (Tag closed cup method) | ° C. | 49.5 | 47.5 | JIS K 2265 |
| Sulfur content (Ultraviolet fluorescence method) | mass ppm | 26 | 34 | JIS K 2541 |
| Cetane value | — | 61.4 | 55.4 | JIS K 2280 |
| Cetane index | — | 59.5 | 46.6 | JIS K 2280 |
| Pour point | ° C. | −7.5 | −15.0 | JIS K 2269 |
| Clogged point | ° C. | 11 | −17 | JIS K 2288 |
| 10% Carbon residue content | — | 0.65 | 0.14 | JIS K 2270 |
| Distillation properties | | | | JIS K 2254 |
| Initial boiling point | ° C. | 127.5 | 147.5 | — |
| 5% Distilling temperature | ° C. | 198.0 | 167.5 | — |
| 10% Distilling temperature | ° C. | 212.5 | 174.0 | — |
| 20% Distilling temperature | ° C. | 231.5 | 191.0 | — |
| 30% Distilling temperature | ° C. | 243.5 | 205.0 | — |
| 40% Distilling temperature | ° C. | 254.0 | 218.5 | — |
| 50% Distilling temperature | ° C. | 262.5 | 233.0 | — |
| 60% Distilling temperature | ° C. | 270.5 | 247.5 | — |
| 70% Distilling temperature | ° C. | 279.5 | 261.0 | — |
| 80% Distilling temperature | ° C. | 291.0 | 275.5 | — |
| 90% Distilling temperature | ° C. | 314.5 | 289.0 | — |
| 95% Distilling temperature | ° C. | 342.0 | 301.0 | — |
| End point | ° C. | 345.5 | 315.0 | — |
| Total amount distilled | % | 97.5 | 98.0 | — |
| Residue | % | 1.0 | 1.0 | — |
| Amount of loss | % | 1.5 | 1.0 | — |
| CHO analysis | | | | |
| Carbon content | mass % | 85.2 | 86.6 | ASTM D5291 |
| Hydrogen content | mass % | 13.6 | 13.0 | ASTM D5291 |
| Oxygen content | mass % | 1.2 | 0.4 | ASTM D5622 |
| Lower heating value (measured value) | kJ/kg | 42,000 | 42,460 | JIS K 2279 |

Each raw material in "HiBD" in (Table 1) was produced based on the description of Japanese Patent No. 5353893. For evaluating the production method, since it was extremely difficult to analyze the complicated data of the crude oil for a bio-fuel (HiBD) in which a large variety of compounds are mixed, as clear from distillation properties, a bio-jet fuel was produced from a model compound, and the production method was analyzed and evaluated.

(2) Preparation of Model Compound

HiBD (raw material: waste food oil) was subjected to composition analysis and was found to generally include 50% of normal paraffin, 29% of an olefin compound, 10% of an aromatic compound, 7% of an oxygen compound, and 1% of naphthene.

The olefin compound in HiBD was easy to be hydrogenated, thus mixing of the olefin compound merely progressed any reactions other than hydrogenation, caused the results to be complicated, and had no effect on the whole evaluation, and thus the model compound was obtained by excluding the olefin compound and mixing paraffin in an amount corresponding to that of the olefin compound.

The distribution of the number of carbon atoms of the linear hydrocarbon compound in HiBD exhibited peaks at numbers of carbon atoms of 15 and 17, and thus hexadecane having an intermediate number of carbon atoms, between 15 and 17, and heptane were selected for the model compound.

The content rate of an aromatic compound was 0.5% or lower and the content rate of naphthene (cycloparaffin) was 15% or lower, according to ASTM D7566 Annex 2.

The content of naphthene in HiBD is a trace amount and naphthene was mostly produced by hydrogenation of an aromatic compound, and thus the content rate of an aromatic compound in the model compound was set to 20% which exceeds 15%. Toluene was selected for the model of an aromatic compound.

Any free fatty acid would be slightly incorporated into HiBD depending on the production method or the production apparatus. Here, 1% of octanoic acid was allowed to be comprised in the model compound, instead of a free fatty acid.

The composition of the model compound was thus determined to be that of a mixed oil of 50% of n-hexadecane, n-heptane, 29% of toluene, and 1% of octanoic acid, as shown in No. 1 in (Table 2).

TABLE 2

| No. | Raw material name | Composition |
|---|---|---|
| 1 | Model compound | n-hexadecane: 50%, n-heptane: 29%, toluene: 20%, octanoic acid: 1% |
| 2 | HiBD crude oil 1 | Palm oil as raw material (acid value 6 mg-KOH/mg) |
| 3 | HiBD crude oil 2 | Waste food oil as raw material (content rate of aromatics 4%) |
| 4 | HiBD crude oil 3 | Palm oil as raw material (content rate of aromatics 2%) |

The compositions shown in (Table 3) were used as hydro-isomerization catalyst.

TABLE 3a

| No. | Catalyst name | Composition |
|---|---|---|
| 1 | Hydrogenation catalyst 1 | Hydrogenation catalyst Sample-A manufactured by Nippon Ketjen Co., Ltd. |
| 2 | Hydrogenation catalyst 2 | Hydrogenation catalyst d-2311L manufactured by Nikko Rica Corporation (Ni: 67.2%, Al: 31.9%, Mo: 0.9%) |
| 3 | Isomerization catalyst 1 | β zeolite preproduction catalyst F05M-1308-1 manufactured by JGC Catalysts and Chemicals Ltd. |
| 4 | Hydrogenation catalyst 3 | Self-produced Ni—Pd/alumina catalyst |
| 5 | Isomerization catalyst 2 | β-type zeolite |
| 6 | Isomerization catalyst 3 | Y-type zeolite |

TABLE 3b

| No. | Composition |
|---|---|
| 1 | Mixed catalyst of hydrogenation catalyst 2 and isomerization catalyst 1 |
| 2 | Isomerization catalyst attached with 3-wt % Cu-supported hydrogenation catalyst 2 (fine powder) |
| 3 | Composite of hydrogenation catalyst 3 and isomerization catalyst 2 |
| 4 | Composite of hydrogenation catalyst 3 and isomerization catalyst 3 |

EXAMPLES

A fixed bed reaction vessel was filled with a hydro-isomerization catalyst prepared using a catalyst described in (Table 3a) as described in (Table 3b) by using a raw material having the raw material name described in (Table 2), and an experiment was performed under conditions of (Table 4) under a hydrogen flow at a flow rate of 200 ml/min with the inside of the vessel being kept at a predetermined temperature.

TABLE 4

| No. | Label | Object of reaction | Catalyst | Raw material | Temperature (° C.) | Pressure (Mpa) | LHSV ($h^{-1}$) |
|---|---|---|---|---|---|---|---|
| 1 | Example 1 | Isomerization (change of pressure) | No. 1 | Model compound | 220 | 1.0 | 0.5 |
| 2 | Example 2 | | No. 1 | Model compound | 220 | 1.5 | 0.5 |
| 3 | Example 3 | | No. 1 | Model compound | 220 | 2.0 | 0.5 |
| 4 | Example 4 | | No. 1 | Model compound | 220 | 0.5 | 0.5 |
| 5 | Example 5 | Hydro-isomerization (crude oil) | No. 2 | HiBD crude oil 1 | 290 | 2.0 | 0.5 |
| 6 | Example 6 | | No. 2 | HiBD crude oil 1 | 300 | 2.0 | 0.5 |
| 7 | Example 7 | Isomerization (change of catalyst) | No. 3 No. 4 | Heptane | 240 | 2.0 | |
| 8 | Example 8 | Isomerization (change of pressure) | No. 3 | Heptane | 240 | 2.0 | |
| 9 | Example 9 | Hydro-isomerization (crude oil) | No. 3 | HiBD crude oil 2 | 240 | 2.0 | 0.5 |
| 10 | Example 10 | Hydro-isomerization (crude oil) | No. 3 | HBD crude oil 3 | 240 | 2.0 | 0.5 |

Each product obtained in Examples was evaluated with (1) GC/MS analysis (component distribution of group of peaks in $C_8$-$C_9$ zone), (2) GC-FID analysis (conversion rate), and (3) pour point (° C.).

The pour point is here a measurement value obtained by immersing a test tube where 1 ml of a sample was taken, in a Dewar flask where ethanol was placed at a volume of one-fourth of the flask, using a thermometer capable of measuring to −100° C., dropping the temperature at an interval of 5° C. with dry ice and cooling the temperature of such an ethanol solvent by 5° C., then retaining the temperature for 3 minutes, then taking out the test tube and inclining the test tube at an angle, and determining the temperature range between the temperature of the sample which did not cause any flowing (not causing dripping) even in resting for 5 seconds and the sample became a solid state, and the temperature+5° C., as the pour point.

Examples 1 to 4

The pressure dependency of the decomposition reaction was confirmed. A particulate mixed catalyst was used as the hydro-isomerization catalyst with respect to the raw material: model compound, and the pressure dependency of the composition of a bio-jet fuel as a product was confirmed by varying the pressure with the reaction temperature being constantly kept at 220° C. and the LHSV ($h^{-1}$) being constantly kept at 0.5. The particulate mixed catalyst here used was one (No. 1 of (Table 3b)) obtained by physically mixing a hydrogenation catalyst d-31 1L manufactured by Nikko Rica Corporation (particle of 2 to 10 mm) as the hydrogenation catalyst and a β zeolite catalyst F05M-1308-1 manufactured by JGC Catalysts and Chemicals Ltd. (pellet of Φ 3.4 mm×3 mm) as the isomerization catalyst at a ratio of about 1:1, by keeping the state of particles.

Figure 3:
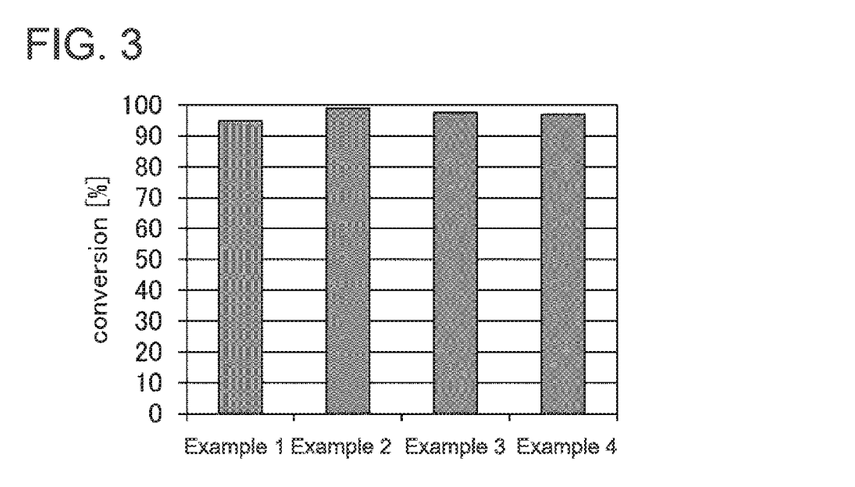
FIG. 3 The conversion rates in Examples 1 to 4 are shown.
Figure 4:
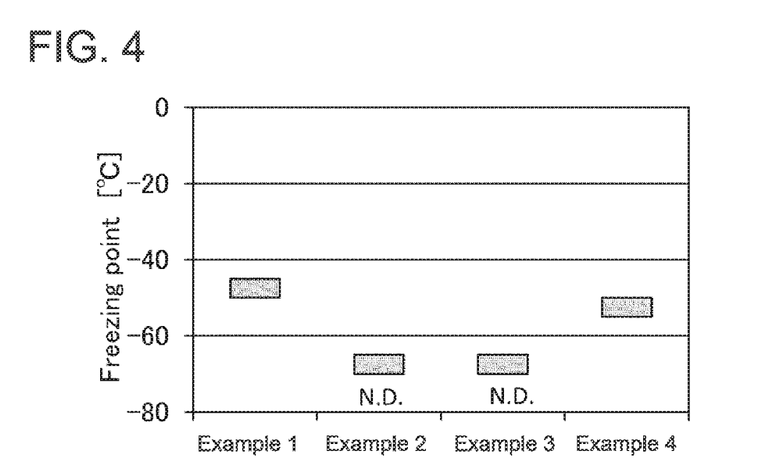
FIG. 4 The pour points of products in Examples 1 to 4 are shown.

The confirmation results are shown in (Table 5) to (Table 7) and (FIG. 2) to (FIG. 4).

TABLE 5

GC/MS analysis: component distribution of group of peaks in C8-C9 zone

| [%] | Example 1 | Example 2 | Example 3 | Example 4 |
|---|---|---|---|---|
| Normal paraffin | 7.5 | 7.8 | 7.7 | 7.9 |
| Isoparaffin | 68.4 | 65.2 | 72.8 | 70.9 |
| Isoolefin | 0 | 0 | 0 | 0 |
| Normal olefin | 0 | 0 | 0 | 0 |
| Cycloolefin | 0 | 0 | 0 | 0 |
| Naphthene | 24.1 | 27.1 | 19.5 | 21.2 |
| Aromatic hydrocarbon | 0 | 0 | 0 | 0 |
| Oxygen-containing compound | 0 | 0 | 0 | 0 |
| Total | 100.0 | 100.0 | 100.0 | 100.0 |

TABLE 6

GC-FID: conversion rate

| [%] | Example 1 | Example 2 | Example 3 | Example 4 |
|---|---|---|---|---|
| Heptane | −37.3 | −43.2 | −43.4 | −31.0 |
| Toluene | 100 | 100 | 100 | 100 |
| Octanoic acid | 100 | 100 | 100 | 100 |
| Hexadecane | 94.7 | 98.9 | 97.5 | 96.9 |

TABLE 7

Pour point

| | Pour point (° C.) | | | |
|---|---|---|---|---|
| Example 1 | −50 | ~ | −45 | |
| Example 2 | N.D. | ~ | −65 | Detection limit |
| Example 3 | N.D. | ~ | −65 | Detection limit |
| Example 4 | −55 | ~ | −50 | |

Figure 2:
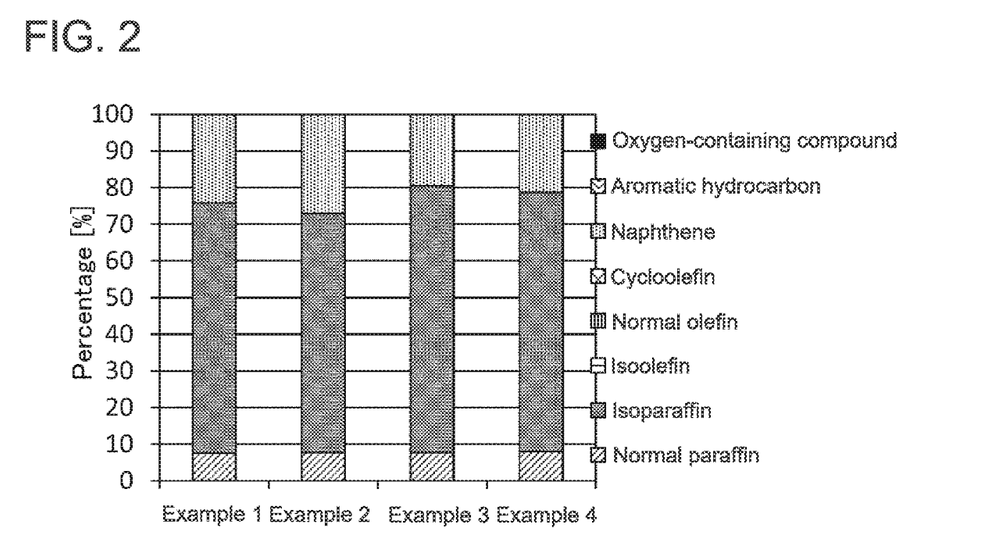
FIG. 2 A composition diagram (C8-9) of products in Examples 1 to 4 is shown.

FIG. 2 is a component distribution diagram of a group of peaks in C8-C9 zone according to GC/MS analysis, FIG. 3 is a conversion rate diagram, and FIG. 4 is a pour point diagram.

As clear from the confirmation results, it was found that a desired reaction proceeded at a low pressure of 0.5 to 2.0 MPa under the conditions of a reaction temperature of 220° C. and a LHSV of 0.5 ($h^{-1}$) by using the particulate mixed catalyst as the hydro-isomerization catalyst with respect to the model compound.

Examples 5 and 6

HiBD crude oil 1 as raw material No. 2 in (Table 2) was used as a raw material.

The temperature dependency of the composition of a bio-jet fuel as a product at a high temperature was confirmed in the Examples. The confirmation was performed in the same conditions as in Example 1 except that not only the reaction temperature was varied to 290° C. and 300° C. with the pressure being kept at 2.0 (MPa) and the LHSV being kept at 0.5 ($h^{-1}$) as in Example 1, but also the hydro-isomerization catalyst was changed to an attached mixed catalyst (No. 2 of (Table 3b)). The component distribution of HiBD crude oil 1 as raw material No. 2 in (Table 2) was confirmed as that of a control raw material. GC-FID was used for calculation of the component distribution. After sample analysis was performed with GC/MS in the same conditions as in GC-FID, each peak was analyzed. Such each peak as each result in GC-FID measurement was subjected to labelling to normal paraffin or the like based on the GC/MS analysis results. After the labelling, the total peak area per compounds of the same class was determined, and the proportion relative to the whole peak area was defined as the component distribution of each compound.

Figure 5:
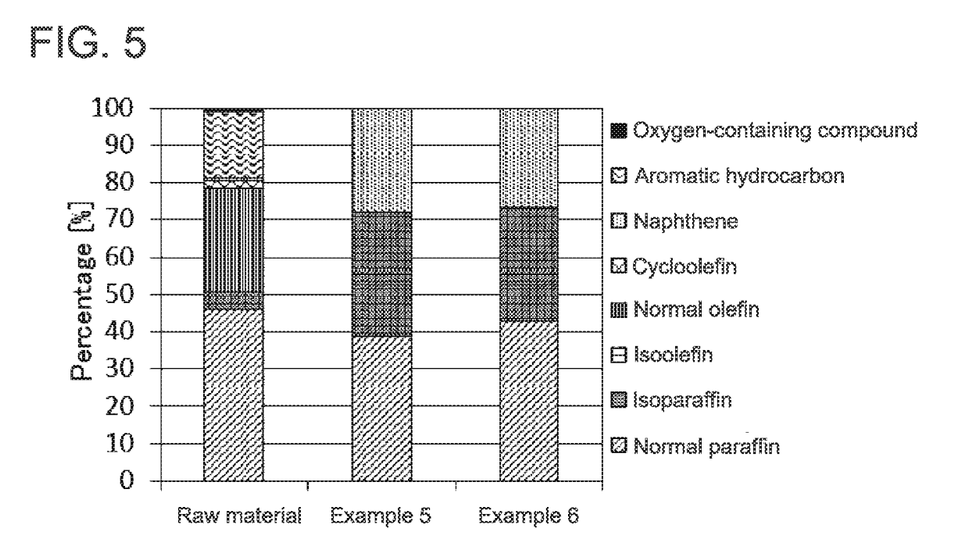
FIG. 5 A composition diagram (C8-9) of products in Examples 5 and 6 is shown.
Figure 6:
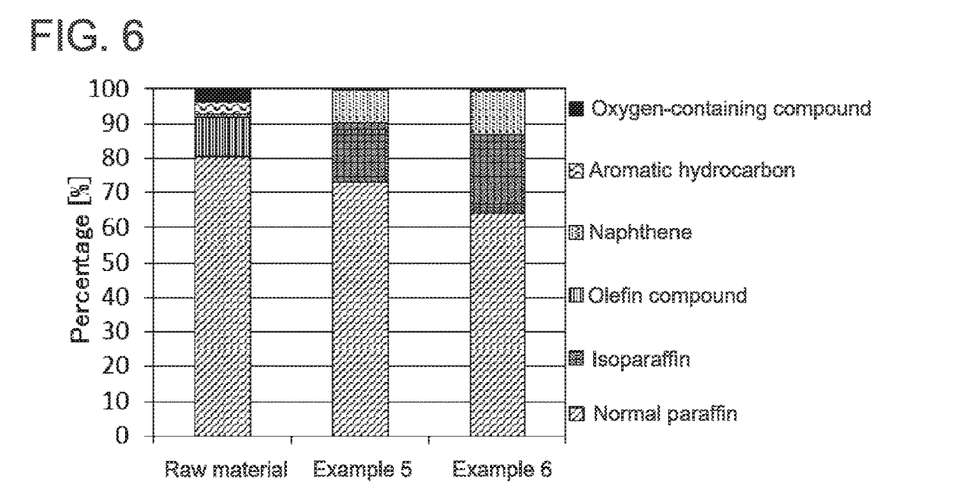
FIG. 6 A composition diagram of products in Examples 5 and 6 is shown.
Figure 7:
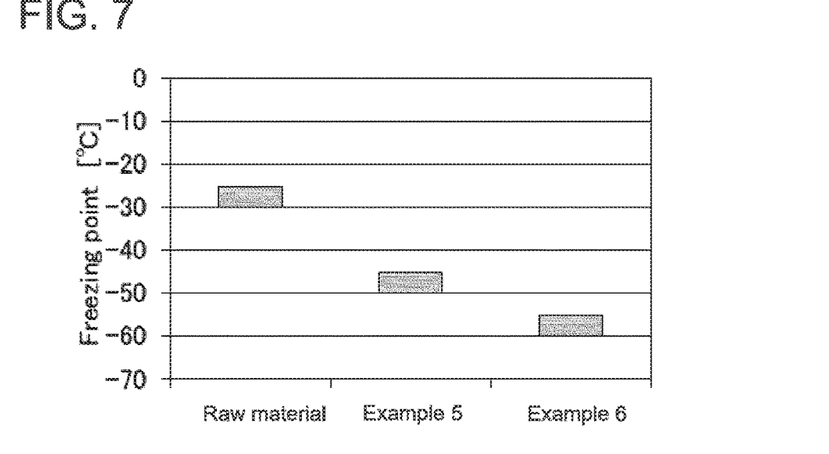
FIG. 7 The pour points of products in Examples 5 and 6 are shown.

The confirmation results were shown in (Table 8) to (Table 11) and (FIG. 5) to (FIG. 7).

TABLE 8

GC/MS analysis: component distribution of group of peaks in C8-C9 zone

| [%] | Raw material | Example 5 | Example 6 |
|---|---|---|---|
| Normal paraffin | 45.8 | 38.7 | 42.7 |
| Isoparaffin | 5.0 | 33.3 | 30.6 |
| Isoolefin | 0 | 0 | 0 |
| Normal olefin | 27.7 | 0 | 0 |
| Cycloolefin | 1.7 | 0 | 0 |
| Naphthene | 0.7 | 28.1 | 26.7 |
| Aromatic hydrocarbon | 18.0 | 0 | 0 |
| Oxygen-containing compound | 0.9 | 0 | 0 |
| Total | 100.0 | 100.0 | 100.0 |

TABLE 9

GC-FID: component distribution

| [%] | Raw material | Example 5 | Example 6 |
|---|---|---|---|
| Normal paraffin | 80.3 | 73.3 | 64.0 |
| Isoparaffin | 0.5 | 16.8 | 22.8 |
| Olefin compound | 10.9 | 0 | 0 |
| Naphthene | 0.8 | 9.5 | 12.6 |
| Aromatic hydrocarbon | 3.6 | 0 | 0 |
| Oxygen-containing compound | 3.9 | 0.5 | 0.5 |
| Total | 100 | 100 | 100 |

TABLE 10

Pour point

| | Pour point (° C.) | | |
|---|---|---|---|
| Raw material | −30 | ~ | −25 |
| Example 5 | −50 | ~ | −45 |
| Example 6 | −60 | ~ | −55 |

TABLE 11

Distilling temperature (Simulated)

| [%] | Raw material | Example 5 | Example 6 |
|---|---|---|---|
| 10% Distilling temperature | 190.5 | 113 | 93 |
| 50% Distilling temperature | 254 | 176 | 153 |
| 90% Distilling temperature | 342 | 245 | 210.5 |
| End point | 575 | 271 | 255 |

As clear from the confirmation results, it was found that raw material No. 2 could be utilized in a high-quality bio-jet fuel under the conditions of use of the attached mixed catalyst as the hydro-isomerization catalyst, a pressure of 2.0 (MPa), and a LHSV of 0.5 ($h^{-1}$).

Example 7

[Examination of Isomerization Catalyst]

It is essential for dropping the pour point to isomerize a normal paraffin which is a linear hydrocarbon to an isoparaffin which is a branched hydrocarbon with a methyl group or the like.

In the present evaluation, a test of a model raw material with heptane was introduced so that isomerization activity of each catalyst could be determined by a simple experimental method. The results were classified into the following three reactions, depending on the type of each product, and then evaluated.

1) Isoheptane was produced (isomerization reaction)
2) Propane and isobutane were produced (decomposition reaction)
3) Methane, ethane, normal pentane, and normal hexane were produced (gasification reaction)

Among these reactions, reaction 1) is the most desirable reaction and reaction 2) is the second desirable reaction. On the other hand, reaction 3) is an undesirable reaction because, when the reaction occurs, a gaseous product such as methane is produced and the yield of a refined oil is decreased in an amount corresponding to the production of methane or the like.

The catalyst was a composite (No. 3 and No. 4 of (Table 3b)) of a Ni—Pd/alumina catalyst and a zeolite relatively large in pore size, such as Y or β zeolite, and heptane was used as a model compound. Each reaction was performed at a reaction temperature of 240° C. and a reaction pressure of 2.0 MPa.

Figure 8:
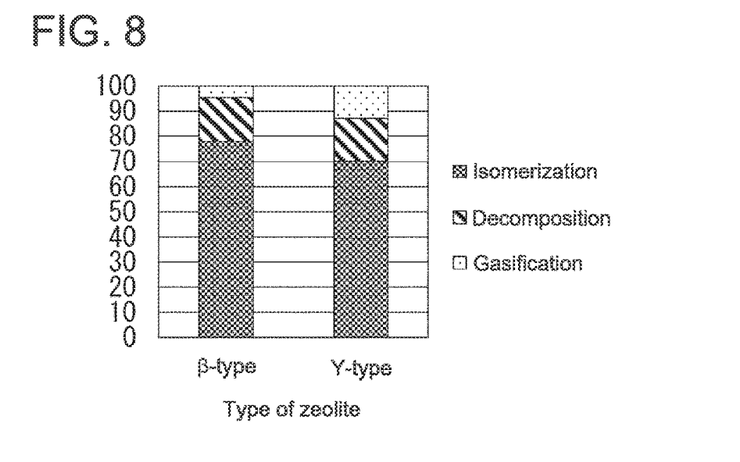
FIG. 8 The selection rates of a product in Example 7 are shown.

The selection rate of each product in the test is shown in Table 12 and FIG. 8.

TABLE 12

| | Type of zeolite | |
|---|---|---|
| Selection rate [%] | β-type | Y-type |
| Gasification | 4.8 | 13.0 |
| Decomposition | 17.3 | 16.9 |
| Isomerization | 77.9 | 70.1 |
| Total | 100.0 | 100.0 |

It was found as shown in Table 12 and FIG. 8 that not only β-type zeolite, but also Y-type zeolite was excellent as an isomerization catalyst.

Example 8

[Examination of Reaction Pressure]

A comparison evaluation test of activity with respect to the isomerization reaction by varying the reaction pressure was performed.

Heptane was used as a raw material, as in the above. The reaction temperature was 240° C., the pressure was 1.0, 2.0, or 3.0 MPa, and the catalyst here used was a composite of a Ni—Pd/alumina catalyst and zeolite.

Figure 9:
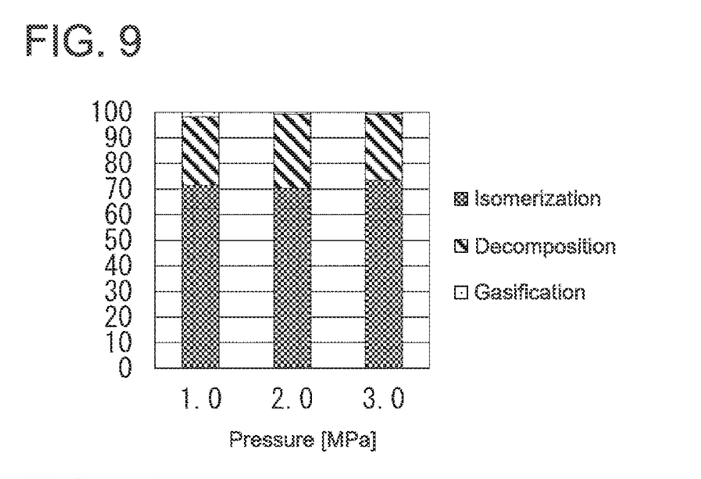
FIG. 9 The selection rates of a product in Example 8 are shown.

The selection rate of each product in the test is shown in Table 13 and FIG. 9.

TABLE 13

| | Pressure [Mpa] | | |
|---|---|---|---|
| Selection rate [%] | 1.0 | 2.0 | 3.0 |
| Gasification | 1.9 | 0.9 | 0.7 |
| Decomposition | 26.6 | 28.8 | 26.0 |
| Isomerization | 71.4 | 70.3 | 73.3 |
| Total | 100.0 | 100.0 | 100.0 |

The selection rate in the isomerization reaction being a desirable reaction at any pressure was remarkably high. It was thus found that a sufficient isomerization reaction proceeded even at a low pressure of 1.0 to 3.0 MPa.

Examples 9 and 10

[Characteristics of Refined Oil Obtained from Crude Oil]

Respective crude oils (crude oil 2 and crude oil 3) obtained from waste food oil were used for raw materials, thereby obtaining refined oils at a reaction temperature of 240° C. and at a pressure of 2.0 MPa by the same catalyst as in Example 8.

The resulting refined oils were each subjected to calculation of the distribution of the number of carbon atoms from the GC analysis result, calculation of the component distribution by means of GC/MS, and measurements of the total acid value and the pour point. The respective results of characteristics of the refined oils are shown in Tables 14 to 15 and FIGS. 10 to 13.

TABLE 14

| Selection rate [%] | Example 9 | | Example 10 | |
|---|---|---|---|---|
| | Crude oil 2 | Refined oil | Crude oil 3 | Refined oil |
| C8 or lower | 0.6 | 23.2 | 0.2 | 26.7 |
| C9-15 | 43.1 | 67.4 | 47.4 | 67.1 |
| C16 or more | 56.3 | 9.3 | 52.4 | 6.2 |

Figure 10:
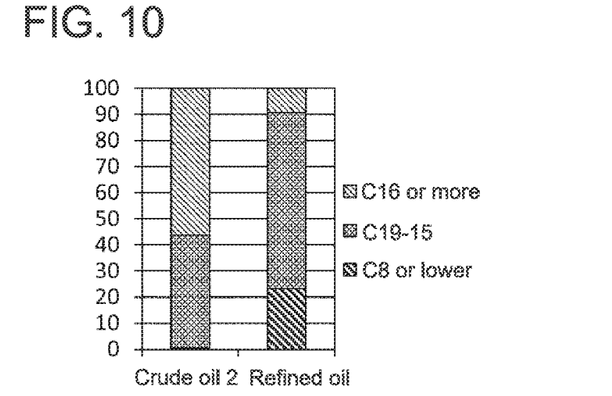
FIG. 10 The distribution of the number of carbon atoms in a product in Example 9 is shown.
Figure 11:
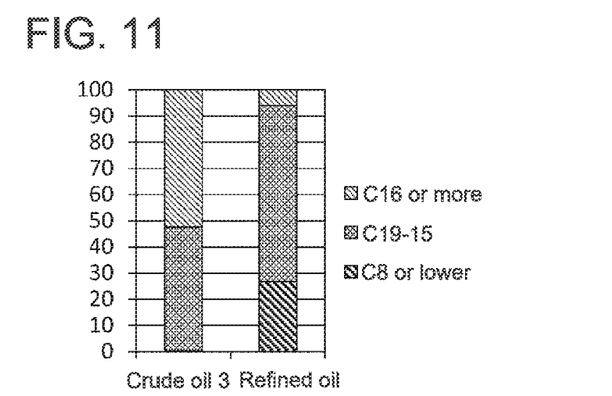
FIG. 11 The distribution of the number of carbon atoms in a product in Example 10 is shown.

Table 14, and FIG. 10 and FIG. 11 show the distribution of the number of carbon atoms of each of the refined oils. It was found from the results that a C9-15 fraction as a jet fraction was increased in each of Examples 9 and 10.

TABLE 15

| Component distribution [%] | Example 9 | | Example 10 | |
|---|---|---|---|---|
| | Crude oil 2 | Refined oil | Crude oil 3 | Refined oil |
| Normal paraffin | 69.0 | 26.2 | 70.8 | 26.6 |
| Isoparaffin | 1.7 | 63.7 | 0.3 | 68.1 |
| Isoolefin | 0.0 | 0.0 | 0.0 | 0.0 |
| Normal olefin | 11.0 | 0.0 | 11.0 | 0.0 |
| Cycloolefin | 0.4 | 0.0 | 2.2 | 0.0 |
| Cycloparaffin | 1.5 | 7.3 | 4.9 | 4.4 |
| Aromatics | 3.9 | 0.0 | 1.6 | 0.0 |
| Oxygen-containing aromatics | 0.2 | 0.0 | 0.3 | 0.0 |
| Oxygen-containing cycloparaffin | 0.4 | 0.6 | 0.9 | 0.0 |
| Oxygen-containing cycloolefin | 0.1 | 0.0 | 0.0 | 0.0 |
| Oxygen-containing linear hydrocarbon | 11.8 | 2.3 | 8.0 | 0.8 |
| Total | 100 | 100 | 100 | 100 |
| Cyclic compound [%] | 6.5 | 7.9 | 9.9 | 4.4 |
| Aromatic hydrocarbon [%] | 4.0 | 0.0 | 2.0 | 0.0 |
| Acid value [mgKOH/g-oil] | 0 | 0 | 0 | 0 |
| Pour point [° C.] | −10~−5 | −50~−45 | −10~−5 | −55~−50 |

Figure 12:
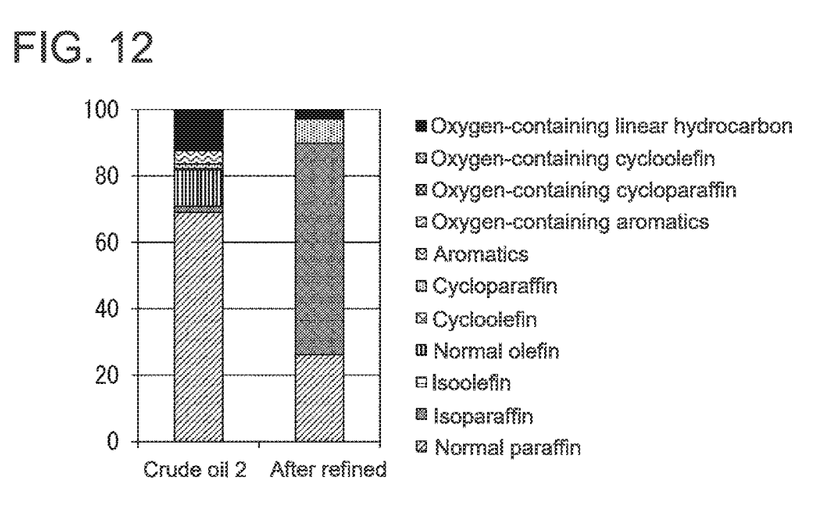
FIG. 12 A composition diagram of a product in Example 9 is shown.
Figure 13:
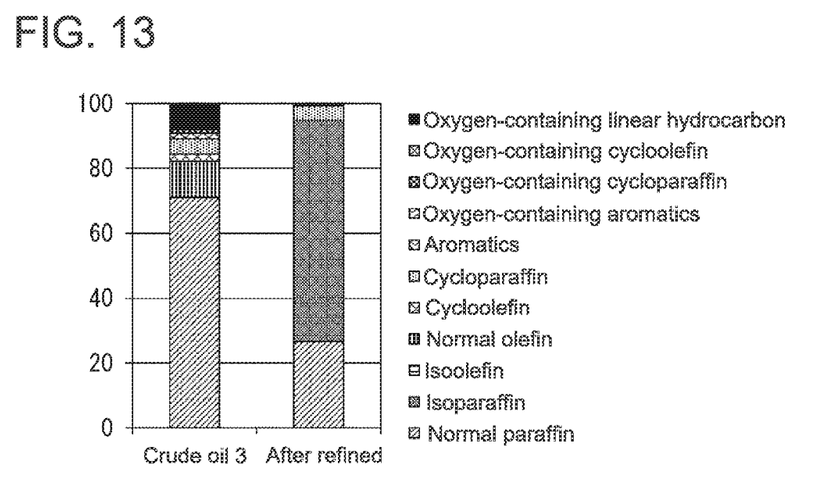
FIG. 13 A composition diagram of a product in Example 10 is shown.

Table 15 shows the component distribution, acid value and pour point of each of the refined oils, and furthermore FIG. 12 and FIG. 13 each show a component distribution diagram of each of the refined oils. The cyclic compound in Table 15 refers to all cyclic compounds of cycloparaffin, cycloolefin, an aromatic compound, and the like.

The proportions of cycloparaffin and aromatics in each of the refined oils of Example 9 and Example 10 were 7.3% and 0%, and 4.4% and 0%, respectively. The standard values of cycloparaffin and aromatics according to the ASTM standard are a maximum of 15 mass % and a maximum of 0.5 mass %, respectively. Thus, the proportions in Examples 9 and 10 satisfied the standard values. The ASTM standard value defines 0.015 mgKOH/g-oil as the maximum value with respect to the acid value, and the ASTM standard value defines −40° C. with respect to the pour point. As shown in Table 15, the refined oils in Examples 9 and 10 each exhibited an acid value of 0 mgKOH/g-oil, and exhibited a pour point of −50 to −45° C. in Example 9 and a pour point of −55 to −50° C. in Example 10, and thus such acid values and pour points satisfied the ASTM standard values.

INDUSTRIAL APPLICABILITY

The present invention is a significant invention relating to a method for producing a bio-jet fuel, which can provide a high-quality bio-jet fuel at a high yield.

REFERENCE SIGNS LIST 1 hydrogen mass flow controller
2 raw oil tank
3 transfer pump
4 pressure gauge
5 fixed bed-type reaction vessel
6 heater
7 hydro-isomerization decomposition catalyst layer
8 external temperature controller
9 internal temperature controller
10 cooler
11 bio-jet fuel reservoir
12 pressure holding valve
13 outflow portion

The invention claimed is:

1. A method comprising:
   obtaining a crude oil by a decarboxylation treatment of a raw oil containing a triglyceride and/or a free fatty acid by using a fat and oil decarboxylation decomposition catalyst comprising any one of magnesium hydroxide, magnesium oxide, and magnesium carbonate, wherein the decarboxylation treatment is performed without supplying hydrogen; and
   hydrogenating, isomerizing, and decomposing the crude oil by using a hydrogenation catalyst comprising Ni and Pd, and an isomerization catalyst comprising a zeolite in a hydrogen atmosphere under conditions of a reaction temperature in a range of 180° C. to 350° C. and a pressure in a range of 0.1 MPa to 30 MPa to obtain a refined oil.

2. The method according to claim 1, wherein the hydrogenation, isomerization and decomposition are performed by using a hydro-isomerization catalyst comprising the hydrogenation catalyst and the isomerization catalyst.

3. The method according to claim 2, wherein the hydrogenation, isomerization and decomposition are simultaneously performed by using the hydro-isomerization catalyst comprising the hydrogenation catalyst and the isomerization catalyst.

4. The method according to claim 1, wherein the crude oil obtained by the decarboxylation treatment of the raw oil containing a triglyceride and/or a free fatty acid satisfies the following requirements a) to e):
   a) comprising a hydrocarbon compound having 16 or more carbon atoms;
   b) having a pour point of −15° C. or more;
   c) having an aromatic hydrocarbon content rate of 1 to 15 mass %;
   d) having an acid value of 0 to 20 mg-KOH/g-oil; and
   e) having a cyclic compound content rate of 15 mass % or lower.

5. The method according to claim 1, wherein the hydrogenation, isomerization and decomposition are performed at 0.5 MPa to 3 MPa.

6. The method according to claim 2, wherein the hydro-isomerization catalyst is a mixed catalyst having a mixing ratio of hydrogenation catalyst:isomerization catalyst of 5:95 to 95:5.

7. The method according to claim 2, wherein the hydro-isomerization catalyst is a composite of the hydrogenation catalyst and the isomerization catalyst.

8. The method according to claim 2, wherein the hydrogenation catalyst is powderized so as to have a particle size smaller than a particle size of the isomerization catalyst, and is attached to or supported on a surface of the isomerization catalyst.

9. The method according to claim 1, wherein the refined oil obtained by hydrogenating, isomerizing, and decomposing the crude oil satisfies the following requirements A) to E):
- A) comprising 60 mass % or more of a hydrocarbon compound having 9 to 15 carbon atoms;
- B) having a pour point of −40° C. or lower;
- C) having an aromatic hydrocarbon content rate of 0.5 mass % or lower;
- D) having an acid value of 0.015 mg-KOH/g-oil or lower; and
- E) having a cycloparaffin content rate of 15 mass % or lower.

10. The method according to claim 1, further comprising recovering the obtained refined oil as a bio-jet fuel.

11. The method according to claim 1, further comprising separating a bio-jet fuel from the obtained refined oil.

12. The method according to claim 1, wherein a pour point of the crude oil is −15° C. to 10° C.

* * * * *